(12) United States Patent
Yuan et al.

(10) Patent No.: US 11,131,255 B1
(45) Date of Patent: Sep. 28, 2021

(54) PISTON ENGINE CYLINDER HEAD WITH COMBINED FUNCTIONS

(71) Applicant: CANADAVFD CORP (LTD), Ottawa (CA)

(72) Inventors: Defang Yuan, Ottawa (CA); Lin Zhao, Ottawa (CA)

(*) Notice: Subject to any disclaimer, the term of this patent is extended or adjusted under 35 U.S.C. 154(b) by 0 days.

(21) Appl. No.: 17/094,300

(22) Filed: Nov. 10, 2020

(51) Int. Cl.
*F02D 15/04* (2006.01)
*F02B 75/04* (2006.01)
*F02B 75/02* (2006.01)
*F02B 3/06* (2006.01)

(52) U.S. Cl.
CPC ............ *F02D 15/04* (2013.01); *F02B 75/044* (2013.01); *F02B 3/06* (2013.01); *F02B 75/042* (2013.01); *F02B 2075/027* (2013.01)

(58) Field of Classification Search
CPC .... F02B 75/042; F02B 2075/027; F02B 3/06; F02B 15/04
See application file for complete search history.

(56) References Cited

U.S. PATENT DOCUMENTS

| | | | |
|---|---|---|---|
| 1,301,658 A * | 4/1919 | Culter | F02B 75/042 123/78 AA |
| 4,169,435 A * | 10/1979 | Faulconer, Jr. | F02B 75/042 123/48 A |
| 2007/0089694 A1 * | 4/2007 | Hacsi | F02B 21/00 123/48 D |

* cited by examiner

*Primary Examiner* — Kevin A Lathers

(57) ABSTRACT

A movable piston head is provided; the piston head has a head cylinder and a upper piston, a first port and a second port on the head cylinder wall, a first path and a second path in the upper piston, when the first port aligns with the first path horizontally, or the second port aligns with the second path horizontally, the combustion chamber is communicating with external, the upper piston moves up and down to perform intake, exhaust, compression, seal the combustion chamber from external. A variable compression ratio engine and a shifted minimum combustion chamber volume engine are provided. Fuel efficiency is improved and manufacturing cost is reduced, different working sequences and compression ratio control are also provided in the invention.

18 Claims, 9 Drawing Sheets

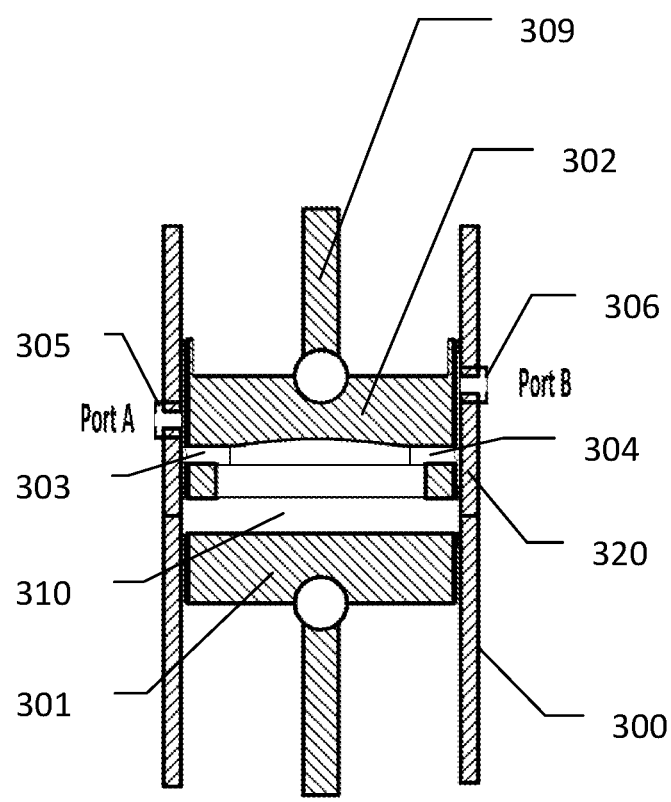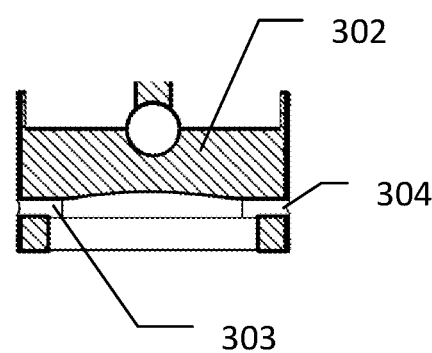
Figure 3A                    Figure 3B

PISTON ENGINE CYLINDER HEAD WITH COMBINED FUNCTIONS

FIELD OF THE INVENTION

The present disclosure relates to piston engine. More specifically, the present disclosure relates to a novel piston engine cylinder head which combines variable compression ratio adjustment, intake and exhaust controls. The fuel efficiency is improved and manufacturing cost is reduced.

BACKGROUND OF THE INVENTION

There are certain disadvantages relating to the existing prior art piston engines:
1) In traditional four-stroke engine, multiple intake and exhaust valves are used, this makes the piston engine bigger in size and costly in manufacturing;
2) In traditional four-stroke engine, the minimum combustion chamber volume is at the position of the top dead center (TDC) of the piston; the minimum combustion chamber volume position is the crank angle where the maximum combustion pressure can be achieved for a given amount of fuel. When the peak pressure position (PPP) is near the top dead center (TDC), the torque produces on the crankshaft is low or even nearly zero, it is almost impossible to adjust the position of minimum combustion chamber in prior art engine;
3) In two-stroke opposed piston engine, intake and exhaust valves are simplified as an exhaust port and an intake port, but this configuration causes excessive lubrication oil consumption, because cylinder lubrication oil is over exposed to intake air/gases when pistons moving from their top dead centers (TDCs) to their bottom dead centers (BDCs);
4) In two-stroke opposed piston engine, the minimum combustion chamber volume is near the position(s) of the top dead center(s) (TDCs) of the piston(s), the minimum combustion chamber volume position is the crank angle where the maximum combustion pressure can be achieved for a given amount of fuel. When the peak pressure position (PPP) is farther away from the position of minimum combustion chamber volume, the torque on the crankshaft is low, it is very complex to adjust the position of minimum combustion chamber volume position in two-stroke opposed engine.

Therefore, there remains a need for novel piston engine which is small in size and low in manufacturing cost, and the position of minimum combustion chamber can be adjusted and is apart or farther away from TDC position(s), and engine fuel efficiency to be improved.

SUMMARY OF THE INVENTION

The present invention aims to achieve a movable and multi-function cylinder head, so that when used with a main piston and a main cylinder:
1) The position of minimum combustion chamber volume can be adjusted and is farther away from TDC, the torque on crankshaft is much higher than prior art piston engine;
2) Both the intake and exhaust can be controlled by the movable cylinder head, the control mechanisms are sample and low in cost;
3) The compression ratio can be adjusted by phase-shift in cylinder head movement;
4) The piston engine can burn different types of fuels;
5) And lubrication oil consumption is low than that of prior art opposed engine.

According to one aspect of the invention, there is provided a movable piston engine head, comprising:
a head cylinder,
an upper piston,
the upper piston configured to fit horizontally and sealingly in the head cylinder and move up and down along its centerline,
the head cylinder aligns with and connects to a main cylinder sealingly,
the main cylinder encloses a main piston,
the bottom face of the upper piston and the top face of the main piston defines a combustion chamber wherewithin the head cylinder and the main cylinder, the combustion chamber volume changes between its minimum to its maximum in operation, the position of the minimum combustion volume is located at a position between 10° and 75° of crank angle of the main piston,
the spaces outside of the combustion chamber is defined as external,
the head cylinder has a first port and a second port,
the first port and the second port are through holes on different sides of the wall of the head cylinder,
the upper piston has a first path and second path,
the first path and the second path are air passages connecting the vertical sides the upper piston to the bottom face of the upper piston,
when the first port aligns with the first path horizontally, the combustion chamber communicates with the external,
when the second port aligns with the second path horizontally, the combustion chamber communicates with external,
when neither the first port aligns with the first path nor the second port aligns with the second path horizontally, the combustion chamber is sealed from the external,
the upper piston moves to its lowermost position after 15° of the crank angle of the main piston,
wherein at least in one position from 10° to 75° crank angle of the main piston, the lowermost position of the bottom face of the upper piston is overlapped vertically with the uppermost position of the top face of the main piston at different crank angles.

According to one aspect of the invention, there is provided a variable compression ratio piston engine, comprising:
a head cylinder,
an upper piston,
the upper piston configured to fit horizontally and sealingly in the head cylinder and move up and down along its centerline,
the head cylinder aligns with and connects to a main cylinder sealingly,
the main cylinder encloses a main piston,
the bottom face of the upper piston and the top face of the main piston defines a combustion chamber wherewithin the head cylinder and the main cylinder, the combustion chamber volume changes from its minimum to its maximum in operation, the position of the minimum combustion volume is located at a position between 15° and 75° of crank angle of the main piston,
the spaces outside of the combustion chamber is defined as external,
the head cylinder has a first port and a second port, the first port and the second port are through holes on different sides of the wall of the head cylinder, the upper piston has a first path and second path, the first path and the second path are air passages connecting the vertical sides the upper piston to the bottom face of the upper piston, when the first port aligns with the first path horizontally, the combustion chamber communicates with the external, when the second port aligns with the second path horizontally, the combustion chamber communicates with external, when neither the first port aligns with the first path nor the second port aligns with the second path horizontally, the combustion chamber is sealed from the external, the upper piston moves to its lowermost position after 20° of the crank angle of the main piston, wherein at least in one position from 15° to 75° crank angle of the main piston, the lowermost position of the bottom face of the upper piston is overlapped vertically with the uppermost position of the top face of the main piston at different crank angles, a phase shift is defined as the displacement in time between the vertical movement of the upper piston referring to its own initial position and the movement of the main piston referring to its own initial position, a higher compression ratio is obtained when the phase shift is leading, a lower compression ratio is obtained when the phase shift is lagging.

According to one aspect of the invention, there is provided a piston engine with shifted minimum combustion chamber volume, comprising:

a head cylinder, an upper piston, the upper piston configured to fit horizontally and sealingly in the head cylinder and move up and down along its centerline, the head cylinder aligns with and connects to a main cylinder sealingly, the main cylinder encloses a main piston, the bottom face of the upper piston and the top face of the main piston defines a combustion chamber wherewithin the head cylinder and the main cylinder, the combustion chamber volume changes from its minimum to its maximum in operation, the position of the minimum combustion volume is located at a position that is 20° to 75° away from 0° ATDC in crank angle of the main piston, the upper piston moves to its lowermost position after 20° but before 75° ATDC of the crank angle of the main piston, wherein at least in one position from 20° to 75° crank angle of the main piston, the lowermost position of the bottom face of the upper piston is overlapped vertically with the uppermost position of the top face of the main piston at different crank angles, wherein each compression stroke has a first compression stage and a second compression stage, the first compression stage takes place from near 180° BTDC to near 0° ATDC, the second compression stage takes place from near 0° ATDC to near 75° ADTC, the first compression stage has a combustion chamber volume Vc at 0° ATDC, the second compression stage has a minimum combustion chamber volume Vm after 20° ATDC, wherein Vm is smaller than Vc, wherein compression period is longer than combustion period in time.

BRIEF DESCRIPTION OF THE DRAWINGS

By way of example only, preferred embodiments of the present invention are described hereinafter with reference to the accompanying drawings, wherein:

FIG. 3A is an illustration of an embodiment of piston engine in the present invention;

FIG. 3B is an illustration of an embodiment of upper piston in the present invention;

DETAILED DESCRIPTION OF THE INVENTION

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

Graphics are used in order to simplify the descriptions. Most of the parameters in the graphics are scaled for ease of understanding, or are normalized at given conditions. The graphics show a mutual contrast relationship instead of the actual values. The crank angle in the graph is the actual value of main crankshaft.

The directions and positions used in the description, such as up, down, vertically, horizontally, left, and right, are based on the relative directions and relative positions shown in the Figures, and are not necessarily the directions and positions in actual real-life applications.

The terms "rotation" and "revolution" are used to describe angular movement or angular position.

The term "position" used in the description may refer to the physical position or the crank angle position. The abscissa (x-axis) of the variable is identified by the crank angle of main crankshaft.

In the descriptions, all cylinders keep at reference stationary positions and pistons move within the cylinders.

List of Symbols:

| | |
|---|---|
| V | combustion chamber volume |
| Vc | combustion chamber volume when main piston is at its TDC |
| Vm | minimum combustion chamber volume |
| a | crank angle, or CA in degrees of main crankshaft |
| PPP | peak combustion pressure or maximum combustion pressure |
| TDC | top dead center |
| BDC | bottom dead center |
| ATDC | after top dead center |
| BTDC | before top dead center |

Figure 1:
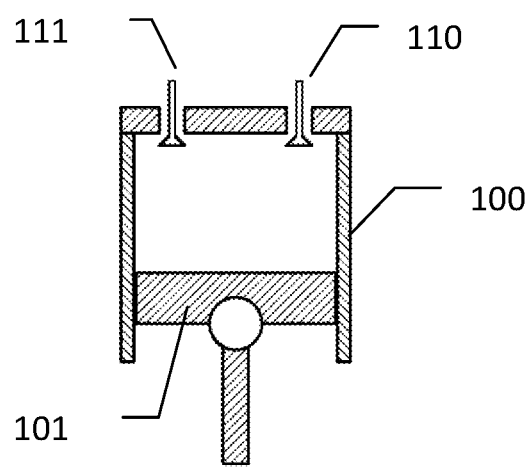
FIG. 1 is an illustration of existing prior art four-stroke engine.

FIG. 1 is an illustration of an existing prior art four-stroke piston engine, which includes a cylinder 100, a piston 101, an exhaust valve 111 and an intake valve 110. One disadvantage of prior art piston engine is that there are a number of valves, intake ports and exhaust ports, control mechanisms (e.g., cam and camshaft), etc. This results the engine big in sizes and costly in manufacturing.

Another disadvantage in prior art piston engine is the minimum combustion chamber volume Vm is at the TDC position of the piston 101, and the TDC position is the worst position for outputting torque.

Figure 2:
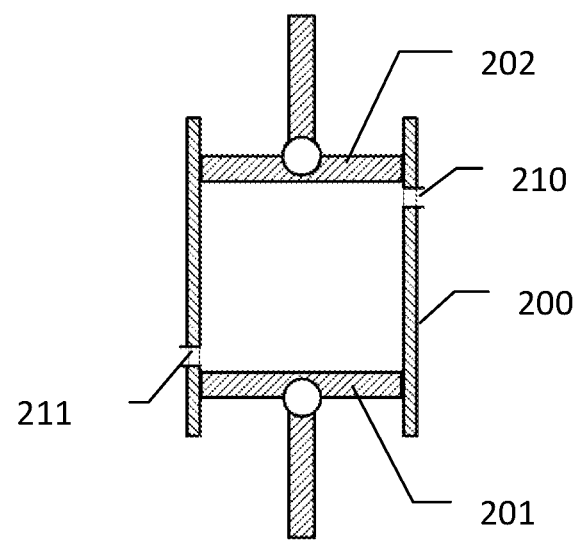
FIG. 2 is an illustration of existing prior art two-stroke opposed engine.

FIG. 2 is an illustration of existing prior art two-stroke opposed engine, which includes cylinder 200, an top piston 202 and a low piston 201, an exhaust port 210 and an intake port 211.

One of the disadvantages of opposed piston engine is the exhaust air/gases and intake air/gases have more chances to mix with lubrication oil, this causes excessive lubrication oil consumption and high exhaust pollution.

Another disadvantage in prior art opposed piston engine is the minimum combustion chamber volume Vm is near the TDC positions of the top and/or low pistons, and the TDC positions are the worst positions for outputting torque.

According to the present invention, an upper piston 302 is configured to perform four functions: sealing, adjusting/controlling minimum combustion chamber volume V, controlling exhaust and intake.

Referring to FIG. 3A, an engine of the present invention comprises a main cylinder 300, a head cylinder 320 (or upper cylinder 320), an upper piston 302 and a main piston 301.

The space between upper piston 302 and main piston 301 wherewithin the main cylinder 300 and head cylinder 320 defines a combustion chamber 310, and its volume is V.

The upper piston 302 and head cylinder 320 as a pair are defined as a movable cylinder head thereafter because it moves vertically and/or rotationally.

Upper piston 302 can be moved up and down sealingly inside head cylinder 320 and/or inside main cylinder 300.

The head cylinder 320 has two ports: port A 305 and port B 306. Port A 305 and port B 306 are through holes on sides of the wall of head cylinder 320.

The upper piston 302 has two air/gas paths: path A 303 and path B 304. Path A 303 and path B 304 are air/gas passages in the body of upper piston 302, path A 303 and path B 304 connect the vertical sides of the upper piston 302 to the bottom face of the upper piston 302. Path A 303 and path B 304 connect to combustion chamber 310 in all operation conditions.

Combustion chamber volume V is the space enclosed in between upper piston 302 and main piston 301 wherewithin the main cylinder 300 and head cylinder 320, the combustion chamber volume V includes the volumes (spaces) of Path A 303 and path B 304.

The upper piston 302 and path A 303 and path B 304 are also shown in FIG. 3B.

When path A 303 aligns horizontally with port A 305, the combustion chamber is connected to external, and air/gas in combustion chamber 310 can communicate with external, then port A 305 is opened. This again is shown in 402 in FIG. 4.

When path B 304 aligns horizontally with port B 306, the combustion chamber is connected to external, and air/gas in combustion chamber 310 can communicate with external, then port B 306 is opened. This again is shown in 404 in FIG. 4.

When neither path A 303 aligns with port A 305, nor path B 304 aligns with port B 306, the combustion chamber 310 is sealed with external, no air/gas is communicating between combustion chamber and external, then both port A 305 and port B 306 are closed. These again are shown in 401 and 403 in FIG. 4.

Figure 4:
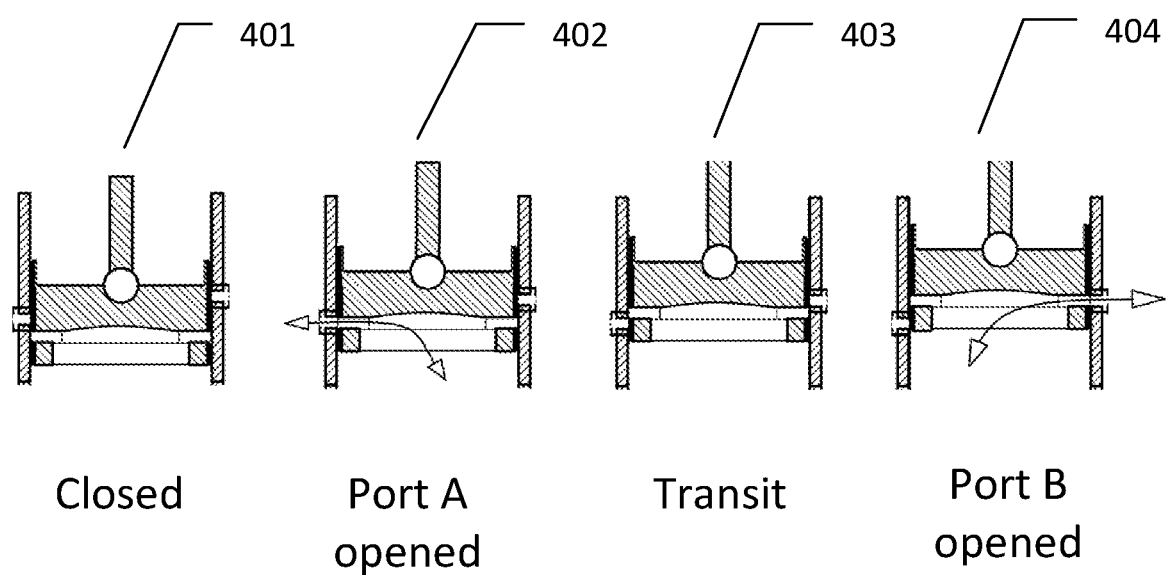
FIG. 4 is an illustration of an embodiment of ports and head cylinder in the present invention.

When the vertical position of upper piston 302 is in between port A and port B, any air/gas commutation between port A and port B is prevented, this statue is described as a transit and is shown in 403 of FIG. 4.

The said external means spaces or rooms outside of the main cylinder 300 and the upper cylinder 320 wherewithin between upper piston 302 and main piston 301.

Head cylinder 320 can be an individual cylinder or can be an extension of main cylinder 300. In other words, cylinder 320 and cylinder 300 can be two cylinders with same bore size and aligned and connected sealingly as in FIG. 3A, or cylinder 320 and cylinder 300 can be a single cylinder respectively.

Push rod 309 can be part of upper piston 302, or can be a separate part which is connected to the upper piston 302.

Port A can be used as exhaust port while port B is used as intake port. Or port B can be used as exhaust port while port A is used as intake port.

Piston 301 is defined as the main piston because it is the main working piston which outputs most working torque. Main piston 301 is working in the same manner or sequences as in prior art piston engines.

Figure 5A:
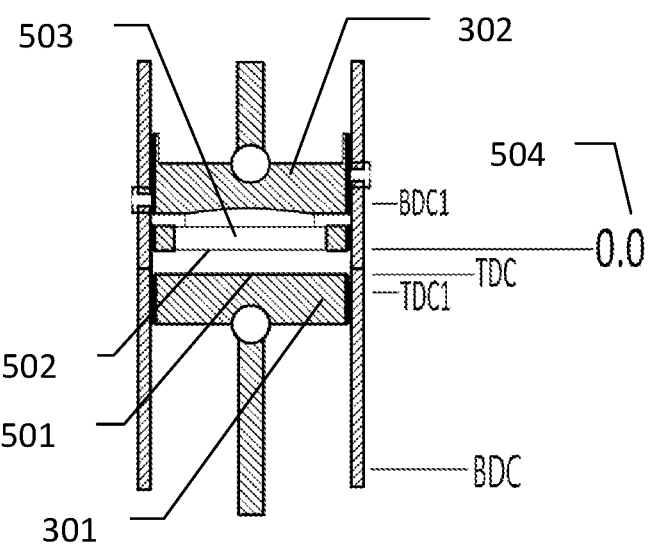
FIG. 5A is an illustration of reference zero and piston positions in the present invention.
Figure 5B:
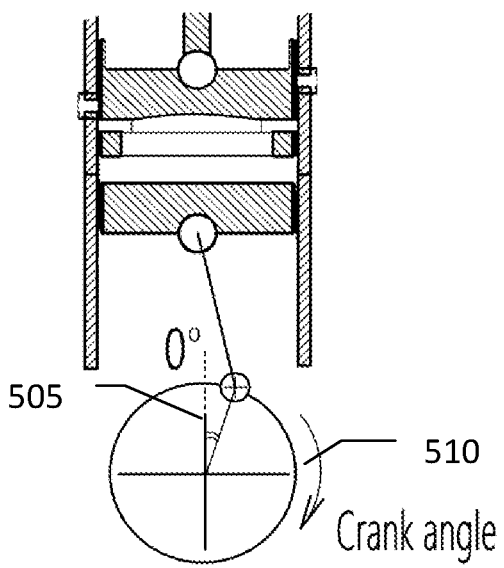
FIG. 5B is an illustration of reference zero of crank angle in the present invention.

Referring to FIG. 5A and FIG. 5B, two reference zero positions are defined:

Vertical reference zero position 504 is defined as the position of the bottom face 502 of the upper piston 302 when the crank angle is zero and both port A and B are closed, as shown in FIG. 5A.

Crank angle reference zero position 505 is defined as the TDC (top dead center) angular position of the main crankshaft 510 in its first rotation (initial rotation), as shown in FIG. 5B.

Referring to FIG. 5A and FIG. 5B, TDCs (TDC and TDC1) and BDCs (BDC and BDC1) are defined as:

TDC position is the uppermost position of the top face 501 of the main piston 301.

BDC position is the lowermost position of the top face 501 of the main piston 301.

TDC1 position is the lowermost position of the bottom face 502 of the upper piston 302.

BDC1 position is the uppermost position of the bottom face 502 of the upper piston 302.

The vertical distance between TDC1 and BDC1 is smaller than the distance between TDC and BDC.

The combustion chamber volume 503 is defined as Vc when both main piston 301 is at its zero position and upper piston 302 is at its zero position.

Figure 5C:
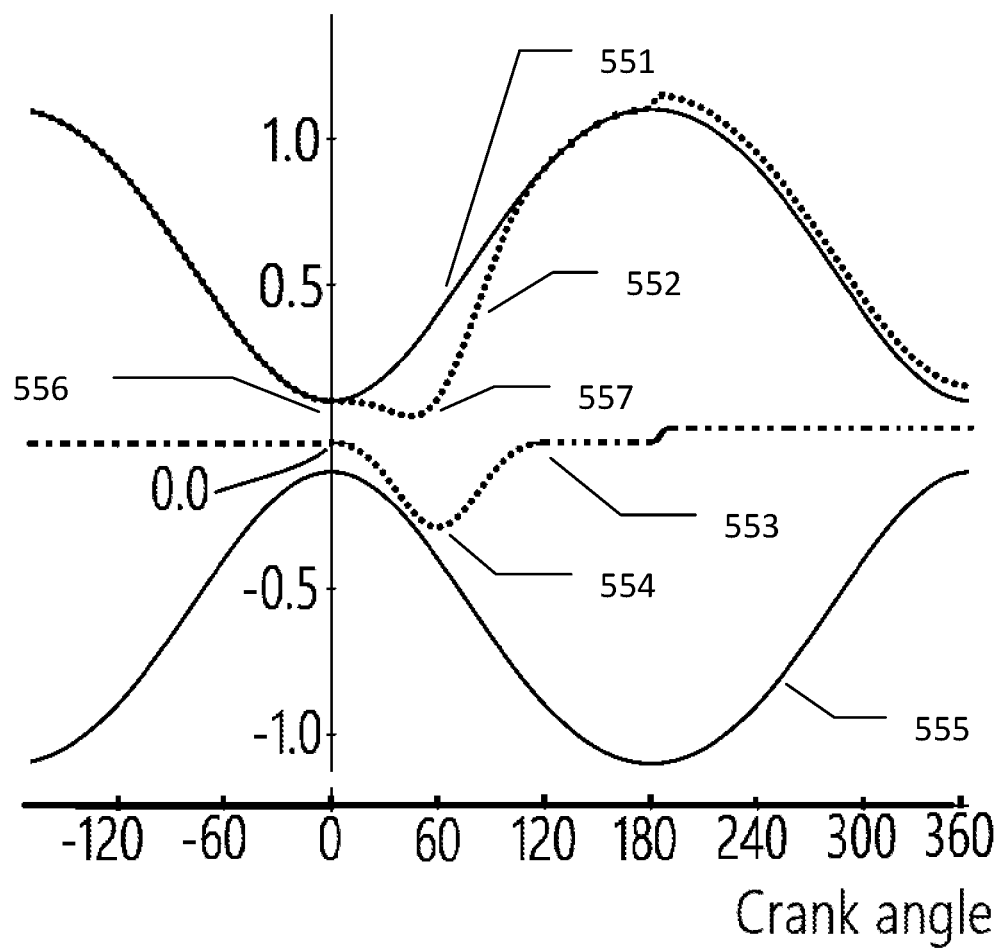
FIG. 5C is an illustration of an embodiment of combustion volume of an engine in the present invention with reference to prior art engine.

Referring to FIG. 5B FIG. 5C, curve 555 is the position (movement) of main piston 301 vs crank angle. This curve is the same as in both prior arts and in examples of this invention.

When cylinder head is a fixed part, as it is in prior art piston engine in FIG. 1, the combustion chamber volume is shown as curve 551; its minimum volume position 556 is at TDC (0° ATDC).

In this invention, when cylinder head has a movable upper piston 302 and moves according to curve 553, the lowest position of upper piston 302 is at about 60° ATDC (or referring as TDC1) and is shown as 554, the combustion chamber volume is shown as curve 552, where its minimum volume position is at about 45° ATDC and is shown as 557.

It is noticeable that the minimum combustion volume moves from 556 to 557. When a peak combustion pressure takes place at 557, its output torque on main crankshaft is higher than at 556.

It is noticeable that the movement curve 553 of upper piston is overlapped with the movement curve 555 of the main piston in vertical direction.

It is noticeable that the combustion chamber volume Vc at 556 is bigger than the minimum combustion chamber volume Vm at 557.

Example 1

In example 1, there is provided a working sequence of embodiments of the present invention.

Figure 6:
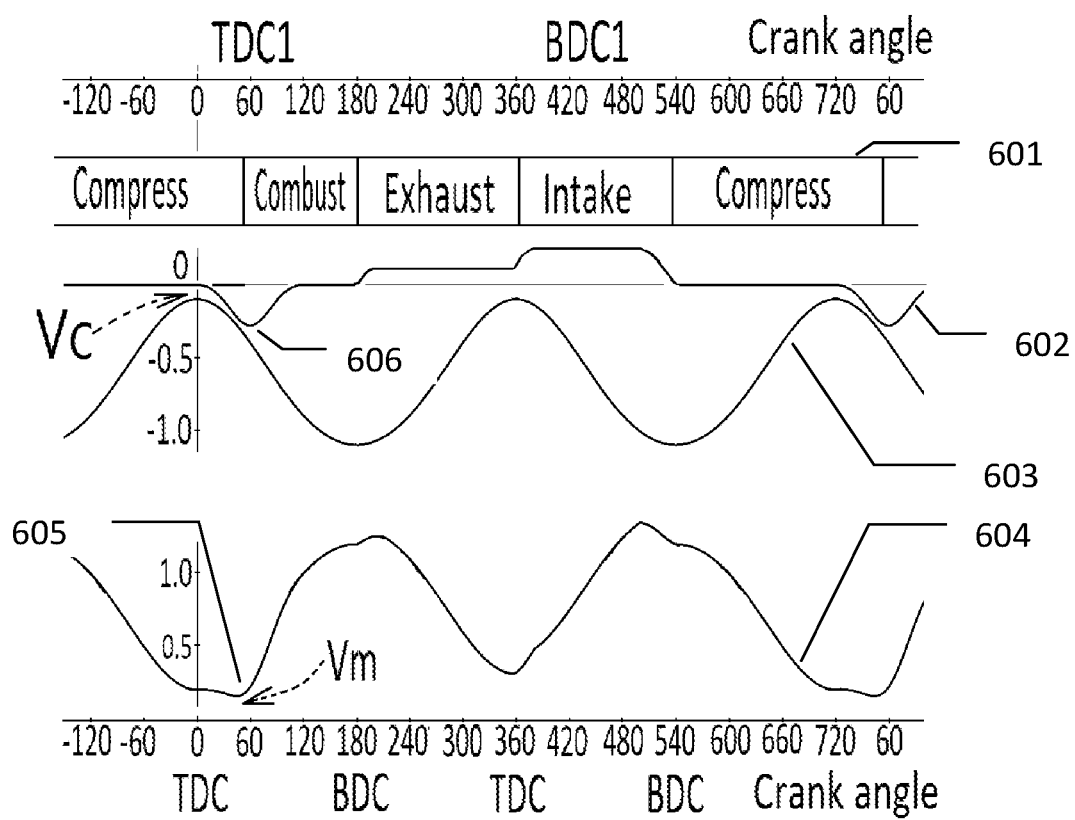
FIG. 6 is an illustration of an embodiment of a working sequences and combustion chamber volume of engine in the present invention.

Referring to FIG. 6.

Wherein port A is used as exhaust port and port B is used as intake port, main piston 301 moves up and down in main cylinder 300. The movement (position) of piston 301 is the same as in prior art piston engines, it is shown as curve 603.

The movement of upper piston 302 is shown as curve 602.

The combustion chamber volume is shown as curve 604.

The x-axis is crank angle of the main piston.

There are four strokes in one complete working cycle.

Stroke 1, Compression.

Compression takes place from near 180° BTDC (or 540° ATDC) to near 45° ATDC, Firstly while main piston 301 moves from its BTD to its TDC, the upper piston 302 stays still vertically at its zero position, and secondly while main piston 301 further moves downwards to its BDC again, the upper piston 302 moves downwards from its position zero toward its TDC1 position.

Air/gas contained in the combustion chamber 310 is compressed by main piston 301 from near 180° BTDC to near TDC.

Air/gas contained in the combustion chamber 310 is further compressed by both main 301 and upper piston 302 from near TDC to near 45° ATDC.

In compression stroke, both port A and port B are closed and the combustion chamber is sealed or closed from external, as 401 in FIG. 4.

The significant difference is the upper piston 302 contributes in compressing the air/gas contained in the combustion chamber from near TDC to near 45° ATDC, as shown as curve 606.

In another word, each compression stroke has two compression stages, the first compression stage takes place from near 180° BTDC to 0° ATDC by the movement of main piston 301, the second compression stage takes place from near 0° ATDC to 45° ADTC by both the movement of main piston 301 and the movement of upper piston 302. While in prior art engines compression are always before 0° ATDC.

The minimum combustion chamber volume Vm is near 45° ATDC position in this example, while in prior art engines the minimum combustion chamber volume is at TDC position (0° ATDC).

In FIG. 6, the combustion chamber volume is Vc at TDC position and the minimum combustion chamber volume is Vm as shown in 605, wherein Vm is smaller than Vc.

By moving minimum combustion chamber volume from TDC (0° ATDC) to near 45° ATDC, torque on main crankshaft is increased by multiple times at same combustion conditions at same given amount of fuel. Because at the same cylinder pressure, the output torque on main crankshaft is higher at bigger crank angle than at smaller crank angle from 0° ATDC to 75° ATDC.

Stroke 2, Combustion.

Ignition is configured to make peak combustion pressure at near Vm position, high pressure in the combustion chamber pushes piston 301 downwards to output torque on main crankshaft, and upper piston 302 returns from its TDC1 to its zero position.

Combustion stroke starts from near Vm position and ends at near 180° ATDC. The combustion stroke period is significantly shorter than the period of compression stroke 1. While in prior art engines the combustion period is the same as that of compression stroke.

In another word, the combustion stroke period is significantly shorter than that in prior art engines at same engine rotation speed.

In combustion stroke, both port A and port B keep closed and the combustion chamber is sealed from external, as 401 in FIG. 4.

Stroke 3, Exhaust.

From near 180° ATDC to 360° ATDC, when main piston 301 moves from its BDC position towards its TDC position, upper piston 302 moves upwards and Port A is opened, air/gas contained in the combustion chamber exhausts to external waste gas system.

In exhaust stroke, port A is opened and port B is closed, and the combustion chamber is communicated with external, as 402 in FIG. 4

Stroke 4, Intake.

From near 360° ATDC to near 540° ATDC, upper piston 302 moves upwards to its uppermost position BDC1, and Port B is opened and port A is closed, air/gas enters into combustion chamber. As shown in 404 of FIG. 4.

At the position near 360° ATDC, there is a transit where both Port A and port B are closed, as shown as 403 in FIG. 4.

At the position near 540° ATDC, there is another transit where both Port A and port B are closed, as shown as 403 in FIG. 4.

The four-stroke sequence is shown as 601 in FIG. 6.

The movement of upper piston 302 is shown as 602 in FIG. 6.

The movement of main piston 301 is shown as 603 in FIG. 6.

The combustion chamber volume is shown as 604 in FIG. 6.

The minimum combustion chamber volume Vm is shown as 605 in FIG. 6.

Next Compression Stroke.

Then the main piston 301 moves upwards from its BDC to TDC and upper piston 302 moves to its zero position at near 540° ATDC (or 180° BTDC) and after, Both port A and port B are closed and air/gas in the combustion chamber is compressed again.

Example 2

In Example 2, there is provided another working sequence of embodiments of the present invention.

Figure 7A:
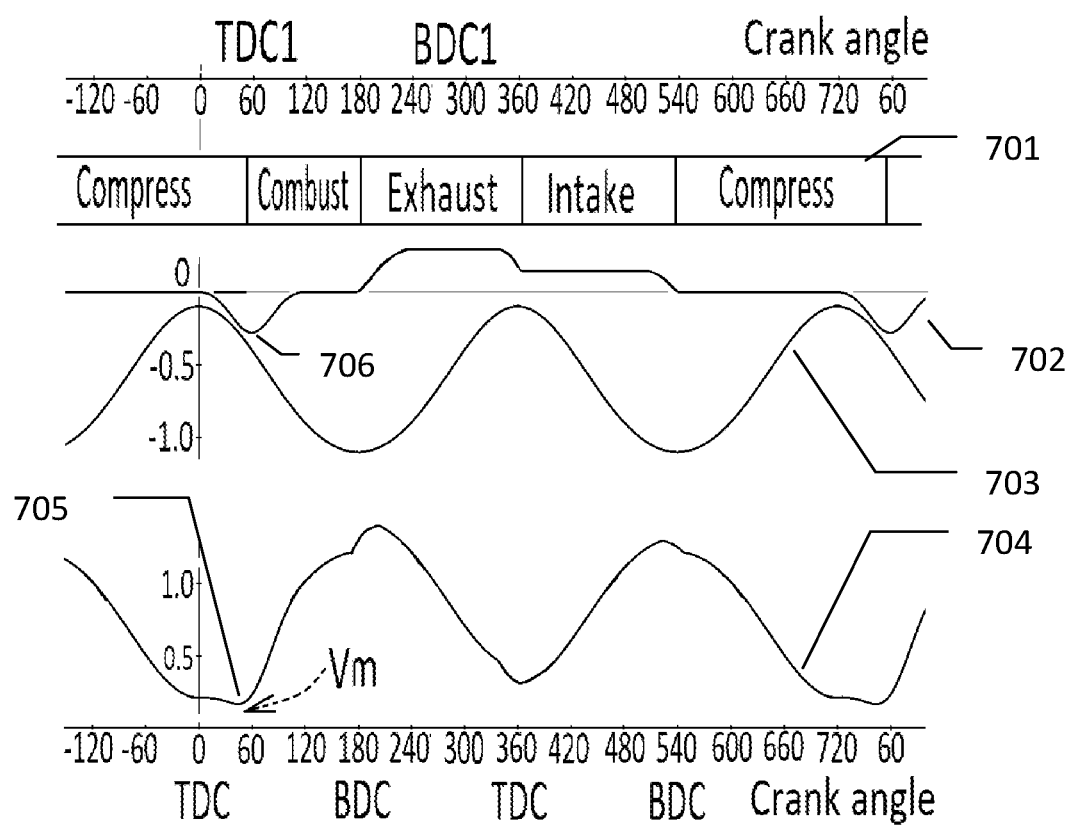
FIG. 7A is an illustration of an embodiment of another working sequences and combustion chamber volume of engine in the present invention.

Refer to FIG. 7A. where port B is used as exhaust port and port A is used as intake port.

The combustion stroke and compression are the same as that in Example 1.

Exhaust stroke.

From near 180° ATDC to 360° ATDC, when main piston 301 moves from its BDC position towards its TDC position, upper piston 302 moves upwards to its uppermost position BDC1 and Port B is opened and port A is closed, air/gas contained in the combustion chamber exhausts to external.

In exhaust stroke, port B is opened and port A is closed, and the combustion chamber is communicated with external, as 404 in FIG. 4

Intake Stroke.

From near 360° ATDC to near 540° ATDC, upper piston 302 moves downwards, port A is opened and port B is closed, air/gas enters into combustion chamber.

At the position near 360° ATDC, there is a transit where both Port A and port B are closed, as shown as 403 in FIG. 4.

At the position near 180° ATDC, there is another transit where both Port A and port B are closed, as shown as 403 in FIG. 4.

The four-stroke sequence is shown as 701 in FIG. 7A.

The movement of upper piston 302 is shown as 702 in FIG. 7A.

The lowest position of the upper piston 302 is shown as 706 in FIG. 7A.

The movement of main piston 301 is shown as 703 in FIG. 7A.

The combustion chamber volume is shown as 704 in FIG. 7A.

The minimum combustion chamber volume Vm is shown as 705 in FIG. 7A.

Example 3

In Example 3, there is provided a third working sequence of embodiments of the present invention.

The compression ratio adjustment can be fulfilled by a phase-shifting in crank angle of upper piston working sequence.

Referring to working sequence 602 and 702 in FIG. 6 and FIG. 7 FIG. 7A, where both working sequences are defined as neutral sequences because there are no phase shift in crank angle.

When the upper piston working sequences 602 and 702 are configured leading or lagging a certain crank angle to the neutral sequences, the correspondent minimum combustion chambers are increased or decreased, and so that the compression ratios are deceased or increased.

Figure 7B:
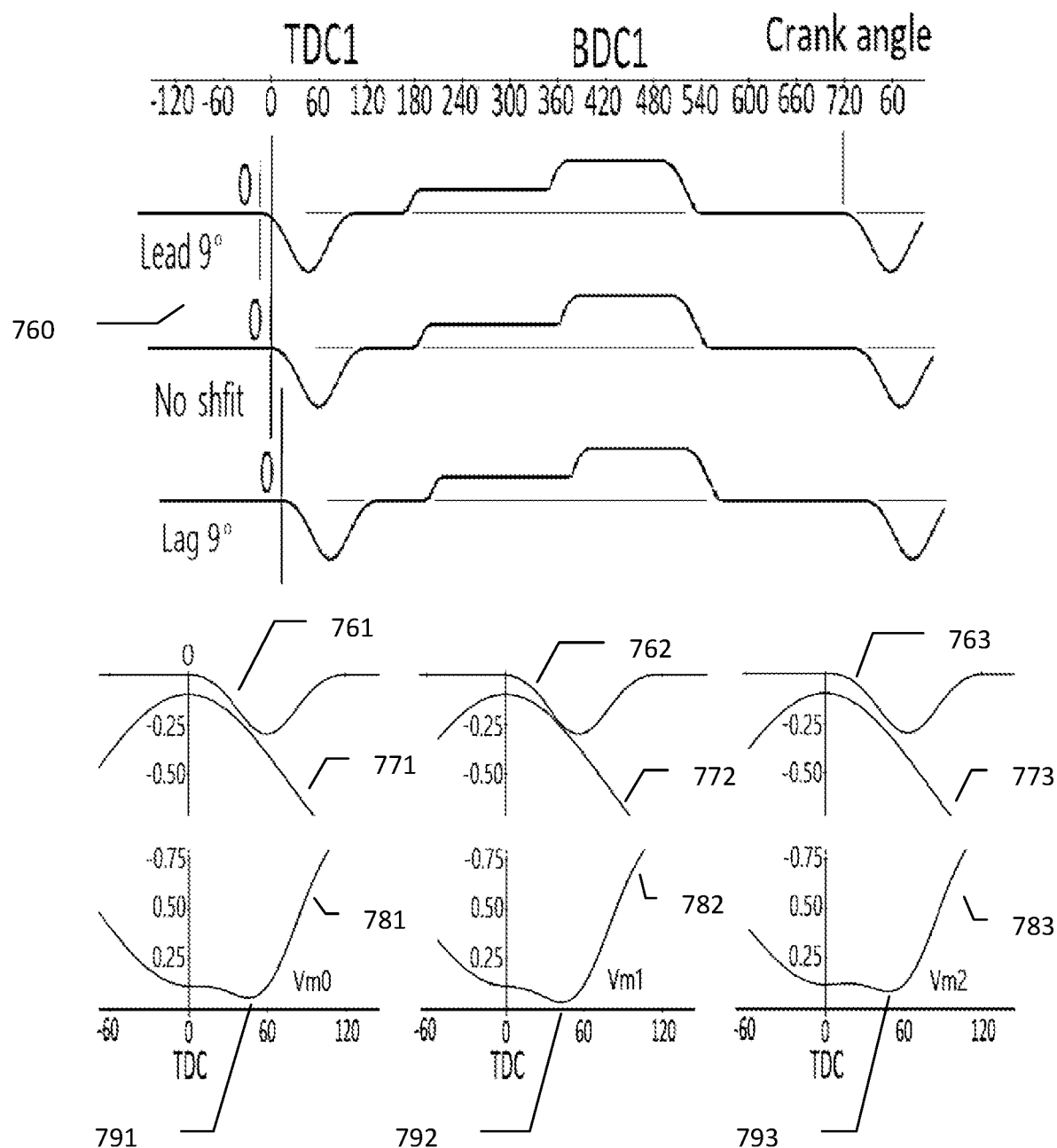
FIG. 7B is an illustration of an embodiment of combustion chamber volumes with phase-shift of upper piston in the present invention.

The details are shown in FIG. 7B.

Sequences 760 in FIG. 7B shows three phase shift examples.

Case one has a 0° leading in phase shift, which is the neutral sequence as is FIG. 6.

Case two has a 9° leading in phase shift with reference to the neutral sequence.

Case three has a 9° lagging in phase shift with reference to neutral sequence.

In case one, the upper piston working sequence is no leading or lagging, the position (movement) of upper piston in shown as 761, the position (movement) of main piston is shown as 771, the combustion chamber volume is shown as 781, and the minimum combustion chamber is Vm0 shown as 791. It is the neutral sequence and is used as reference in this example.

In case two, when the upper piston working sequence is leading 9° in crank angle referring to case one, the position (movement) of upper piston in shown as 762, the position (movement) of main piston is shown as 772, the combustion chamber volume is shown as 782, and the minimum combustion chamber is Vm1 shown as 792. It shows the minimum combustion chamber is decreased, in other words, Vm1 is smaller than Vm0. And compression ratio is increased.

In case three, when the upper piston working sequence is lagging 9° in crank angle referring to case one, the position (movement) of upper piston in shown as 763, the position (movement) of main piston is shown as 773, the combustion chamber volume is shown as 783, and the minimum combustion chamber is Vm2 shown as 793. It shows the minimum combustion chamber is increased, in other words, Vm2 is bigger than Vm0. And compression ratio is decreased.

When a camshaft is used to control the sequence of the upper piston 302, it is easy and low cost to make a leading or lagging shift in crank angle.

Example 4

In example 4, there is provided a fourth example of embodiments of the present invention.

In prior art engines, the amount of air entering into the combustion chamber is controlled by throttle(s) or valves. In this invention, the amount of air entering into the combustion chamber can be controlled by rotating the upper piston 302, the controls are more precise and convenient.

Figure 8:
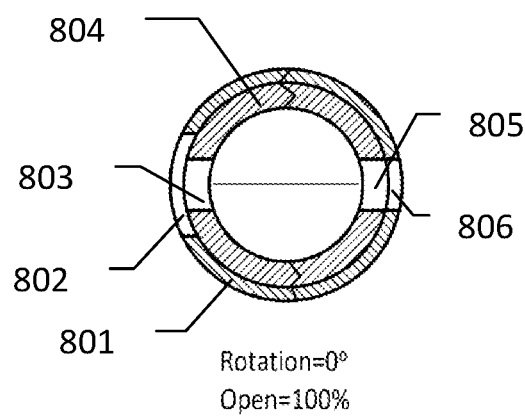
FIG. 8 is an illustration of an embodiment of cylinder head when cylinder head and upper piston is aligned horizontally and with no rotation in the present invention.
Figure 9:
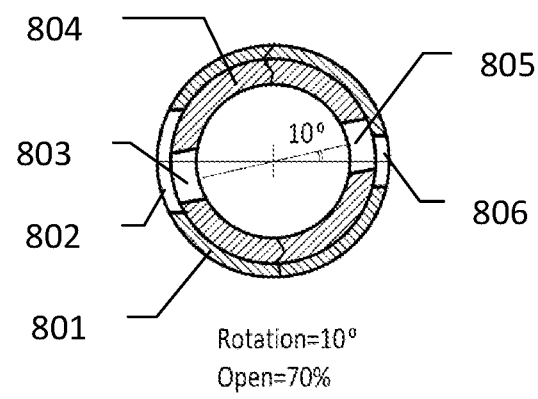
FIG. 9 is an illustration of an embodiment of cylinder head when cylinder head and upper piston is aligned horizontally and with 10 degree rotated in the present invention.

FIG. 8 and FIG. 9 are the section views from bottom side of the upper piston and head cylinder, where alignments between ports and paths are at different vertical positions with reference to the vertical definition in FIG. 5A but are shown in the section view for ease of comparison. Where 804 is the section view of upper piston 302 from bottom, 801 is the section view of head cylinder 320 from bottom.

Referring to FIG. 8,

Port A is 802, path A is 803. There is no rotation in upper piston 302, when Port A 802 and path A 803 is aligned horizontally, the opening of through passage of port A and path A is 100%.

Port B is 806, path B is 805. There is no rotation in upper piston 302, when Port B 806 and path B 805 is aligned horizontally, the opening of through passage of port B and path B is 100%.

Referring to FIG. 9.

Port A is 802, path A is 803. There is 10 degrees rotation in upper piston 302, when Port A 802 and path A 803 is aligned horizontally, the opening of through passage of port A and path A is 100%.

Port B is 806, path B is 805. There is 10 degrees rotation in upper piston 302, when Port B 806 and path B 805 is aligned horizontally, the opening of through passage of port B and path B is 70%.

Where in FIG. 8 and FIG. 9, the head cylinder 320 stays still at its stationary position.

In above examples of embodiments in the invention, the upper piston 302 with its push rod can be controlled by:

1, a cam and camshaft system similar to the controlling of the intake/exhaust valves in prior art engines which is driving by the main crankshaft, 2, a servo motor system, 3, an electric or pneumatic actuator, 4, other types of mechanism.

Due to the unique characteristics of the shifted minimum combustion chamber volume position, some benefits can be obtained:

1, a retarded ignition is preferable in low RPMs (revolutions or rotations per minute) such as 2000 rpms or lower in the present invention while in prior art engines retarded ignition always causes lower output torque.

2, engine knocking can be reduced because the minimum combustion chamber volume position is far away from TDC.

3, lower cylinder temperature can be obtained because combustion period is shorter than that of prior art.

4, multiple fuels can be used because the compression ratio is variable.

The invention claimed is:

1. A movable piston engine head, comprising:
a head cylinder,
an upper piston,
the upper piston configured to fit horizontally and sealingly in the head cylinder and move up and down along its centerline,
the head cylinder aligns with and connects to a main cylinder sealingly,
the main cylinder encloses a main piston,
the bottom face of the upper piston and the top face of the main piston defines a combustion chamber wherewithin the head cylinder and the main cylinder, the combustion chamber volume changes between its minimum to its maximum in operation, the position of the minimum combustion volume is located at a position between 10° and 75° of crank angle of the main piston,
the spaces outside of the combustion chamber is defined as external,
the head cylinder has a first port and a second port,
the first port and the second port are through holes on different sides of the wall of the head cylinder,
the upper piston has a first path and second path,
the first path and the second path are air passages connecting the vertical sides the upper piston to the bottom face of the upper piston,
when the first port aligns with the first path horizontally, the combustion chamber communicates with the external,
when the second port aligns with the second path horizontally, the combustion chamber communicates with external,
when neither the first port aligns with the first path nor the second port aligns with the second path horizontally, the combustion chamber is sealed from the external, the upper piston moves to its lowermost position after 15° of the crank angle of the main piston,
wherein at least in one position from 10° to 75° crank angle of the main piston, the lowermost position of the bottom face of the upper piston is overlapped vertically with the uppermost position of the top face of the main piston at different crank angles.

2. The movable piston engine head in claim 1:
wherein the head cylinder and main cylinder have a same bore size.

3. The movable piston engine head in claim 1:
wherein the head cylinder and main cylinder are integrated into a single cylinder.

4. The movable piston engine head in claim 1:
wherein a first vertical distance is the distance between the uppermost position and lowermost position of the upper piston,
a second vertical distance is the distance between the uppermost position and lowermost position of the main piston,
the second distance is bigger than the first distance.

5. The movable piston engine head in claim 1:
the upper piston further comprising a push rod,
the vertical movement of the push rod is controlled by a camshaft.

6. A variable compression ratio piston engine, comprising:
a head cylinder,
an upper piston,
the upper piston configured to fit horizontally and sealingly in the head cylinder and move up and down along its centerline,
the head cylinder aligns with and connects to a main cylinder sealingly,
the main cylinder encloses a main piston,
the bottom face of the upper piston and the top face of the main piston defines a combustion chamber wherewithin the head cylinder and the main cylinder, the combustion chamber volume changes from its minimum to its maximum in operation, the position of the minimum combustion volume is located at a position between 15° and 75° of crank angle of the main piston,
the spaces outside of the combustion chamber is defined as external,
the head cylinder has a first port and a second port,
the first port and the second port are through holes on different sides of the wall of the head cylinder,
the upper piston has a first path and second path,
the first path and the second path are air passages connecting the vertical sides the upper piston to the bottom face of the upper piston,
when the first port aligns with the first path horizontally, the combustion chamber communicates with the external,
when the second port aligns with the second path horizontally, the combustion chamber communicates with external,
when neither the first port aligns with the first path nor the second port aligns with the second path horizontally, the combustion chamber is sealed from the external,
the upper piston moves to its lowermost position after 20° of the crank angle of the main piston,
wherein at least in one position from 15° to 75° crank angle of the main piston, the lowermost position of the bottom face of the upper piston is overlapped vertically with the uppermost position of the top face of the main piston at different crank angles,
a phase shift is defined as the displacement in time between the vertical movement of the upper piston referring to its own initial position and the movement of the main piston referring to its own initial position, a higher compression ratio is obtained when the phase shift is leading, a lower compression ratio is obtained when the phase shift is lagging.

7. The variable compression ratio piston engine in claim 6,
wherein the upper piston is further movable rotationally,
wherein an amount of intake air entering the combustion chamber is obtained by rotating an angle of the upper piston in the head cylinder.

8. The variable compression ratio piston engine in claim 6,
wherein the position of the minimum combustion chamber volume is at a position after 30° of crank angle of the main piston.

9. The variable compression ratio piston engine in claim 6,
wherein smaller minimum combustion chamber volumes are obtained by leading different crank angles according to types of fuel used, and then compression ratio is higher,
wherein bigger minimum combustion chamber volumes are obtained by lagging different crank angles according to types of fuel used, and then compression ratio is lower.

10. The variable compression ratio piston engine in claim 6,
wherein diesel fuel can be used with compression ignition.

11. A piston engine with shifted minimum combustion chamber volume, comprising:
a head cylinder,
an upper piston,
the upper piston configured to fit horizontally and sealingly in the head cylinder and move up and down along its centerline,
the head cylinder aligns with and connects to a main cylinder sealingly,
the main cylinder encloses a main piston,
the bottom face of the upper piston and the top face of the main piston defines a combustion chamber wherewithin the head cylinder and the main cylinder, the combustion chamber volume changes from its minimum to its maximum in operation, the position of the minimum combustion volume is located at a position that is 20° to 75° away from 0° ATDC in crank angle of the main piston,
the upper piston moves to its lowermost position after 20° but before 75° ATDC of the crank angle of the main piston,
wherein at least in one position from 20° to 75° crank angle of the main piston, the lowermost position of the bottom face of the upper piston is overlapped vertically with the uppermost position of the top face of the main piston at different crank angles,
wherein each compression stroke has a first compression stage and a second compression stage,
the first compression stage takes place from near 180° BTDC to near 0° ATDC,
the second compression stage takes place from near 0° ATDC to near 75° ADTC,
the first compression stage has a combustion chamber volume Vc at 0° ATDC,
the second compression stage has a minimum combustion chamber volume Vm after 20° ATDC,
wherein Vm is smaller than Vc,
wherein compression period is longer than combustion period in time.

12. The piston engine with shifted minimum combustion chamber volume in claim 11:
the head cylinder further has a first port and a second port,
the first port and the second port are through holes on different sides of the wall of the head cylinder,
the upper piston further has a first path and second path,
the first path and the second path are air passages connecting the vertical sides the upper piston to the bottom face of the upper piston,
the spaces outside of the combustion chamber is defined as external,
when the first port aligns with the first path horizontally, the combustion chamber communicates with the external,
when the second port aligns with the second path horizontally, the combustion chamber communicates with external,
when neither the first port aligns with the first path nor the second port aligns with the second path horizontally, the combustion chamber is sealed from the external.

13. The piston engine with shifted minimum combustion chamber volume in claim 12:
wherein the vertical movement of the upper piston is defined as a first curve, and the movement of the man piston is defined as a second curve, the first curve and the second curve are asymmetric in any stroke.

14. The piston engine with shifted minimum combustion chamber volume in claim 12:
wherein a higher output torque can be obtained by retarded ignition in low rotation speed below 2000 rpms of the engine.

15. The piston engine with shifted minimum combustion chamber volume in claim 11:
wherein the vertical movement of the upper piston is asymmetric with reference to the point of the minimum combustion chamber volume Vm position in crank angle.

16. The piston engine with shifted minimum combustion chamber volume in claim 11:
wherein the combustion chamber volume is asymmetric with reference to the point of the minimum combustion chamber volume Vm position in crank angle.

17. The piston engine with shifted minimum combustion chamber volume in claim 11:
wherein peak combustion pressure takes place after 20° ATDC.

18. The piston engine with shifted minimum combustion chamber volume in claim 11:
the upper piston further comprising a push rod,
wherein the vertical movement of the push rod is controlled by a camshaft,
wherein the vertical movement of the push rod and the movement of the man piston are asymmetric in any complete Otto Cycle,
wherein the vertical movement of the push rod and the movement of the man piston are asymmetric in any complete Diesel Cycle.

* * * * *